Oct. 13, 1964     O. M. HART     3,153,119
PORTABLE INSULATED ELECTRIC DISTRIBUTION STRUCTURE
AND METHOD OF MANUFACTURE THEREOF
Filed March 21, 1962     3 Sheets-Sheet 3
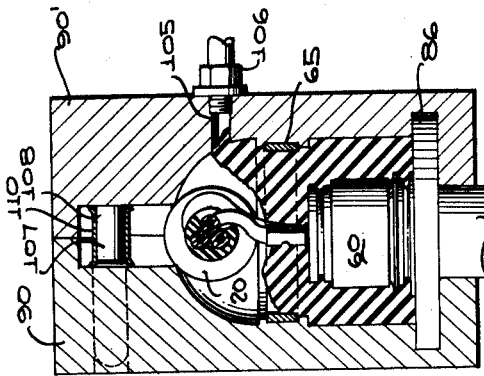
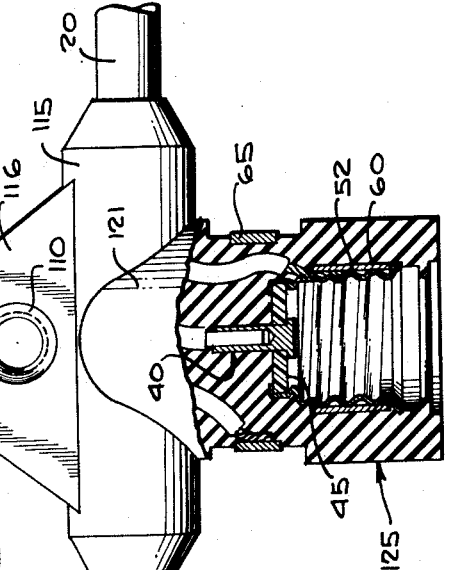
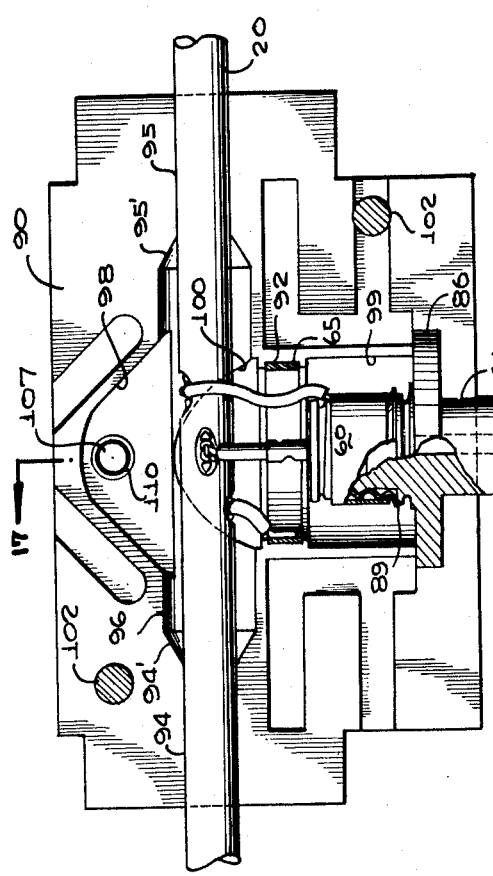
INVENTOR
OLIVER M. HART
BY *Shoemaker and Mattare*
ATTORNEYS

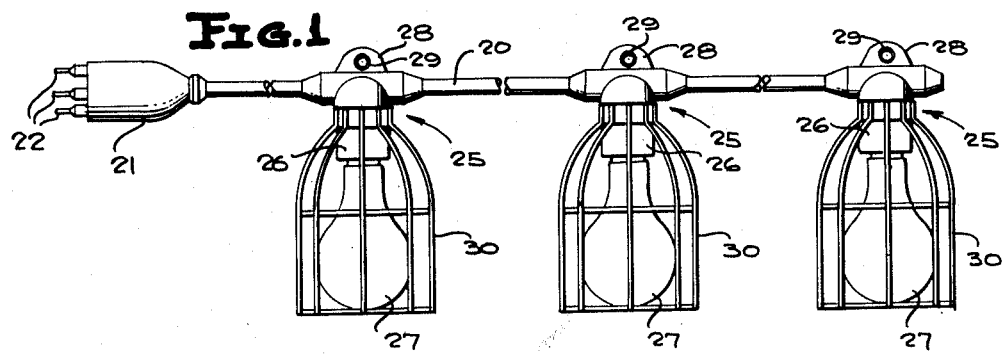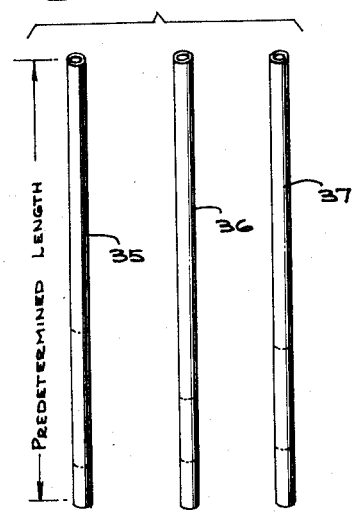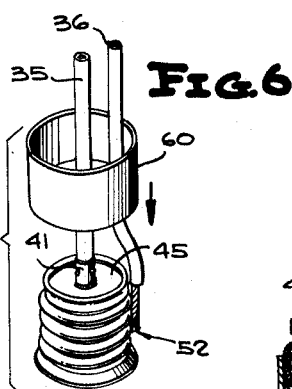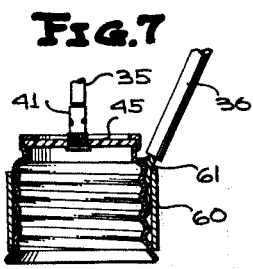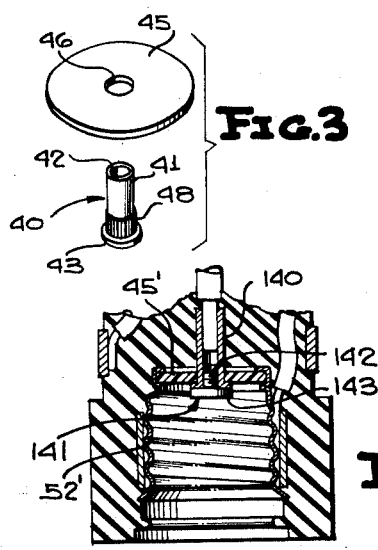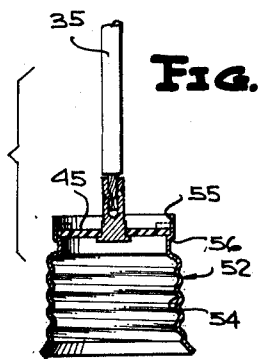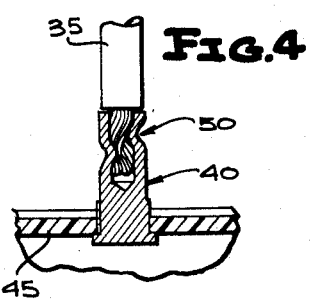

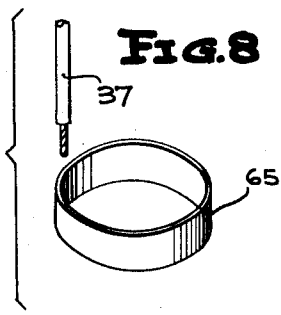
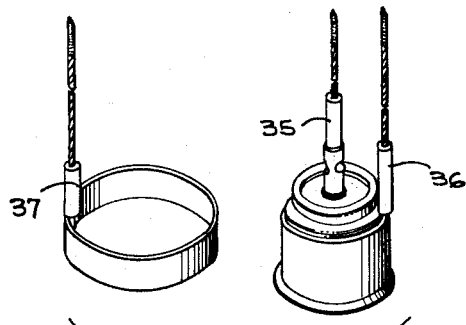
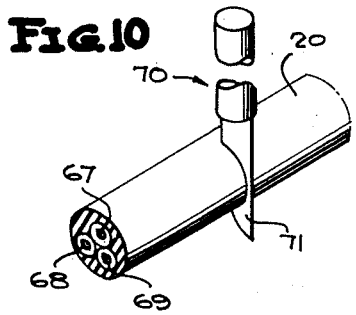
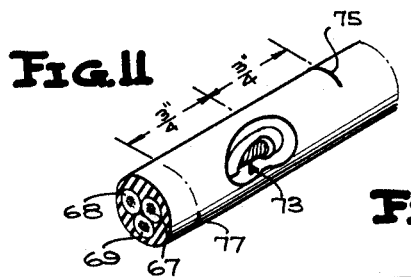
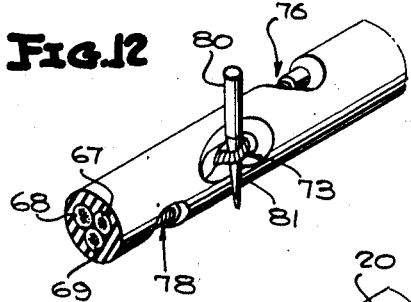
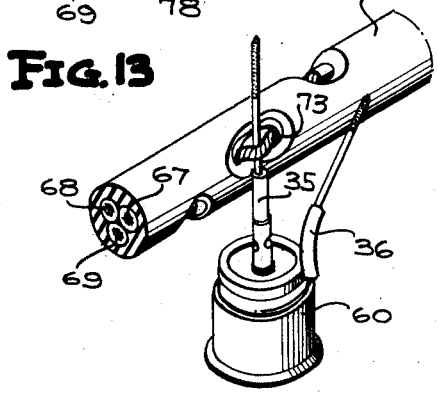
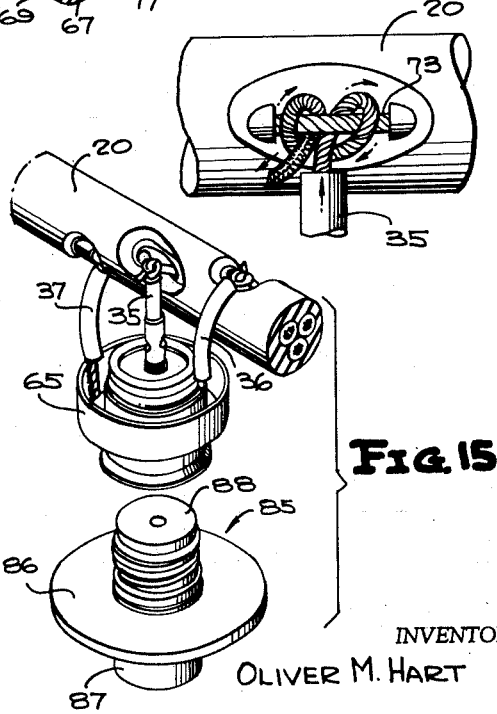

United States Patent Office 3,153,119
Patented Oct. 13, 1964

3,153,119
PORTABLE INSULATED ELECTRIC DISTRIBUTION STRUCTURE AND METHOD OF MANUFACTURE THEREOF
Oliver M. Hart, West Cornwall, Conn.
Filed Mar. 21, 1962, Ser. No. 181,240
9 Claims. (Cl. 174—72)

The present invention relates to a new and novel portable insulated electric distribution structure and method of manufacture thereof, and more particularly to an electric distribution structure incorporating a plurality of spaced electric outlets along an insulated cable.

The present invention is particularly directed to a so-called "streamer" wherein a plurality of electrical outlets are provided at spaced points along a conventional insulated electric cable, the outlets being shown as employed as light sockets, it being apparent that the outlets may be of any desired type for obtaining a power take-off at the various spaced points.

A streamer construction according to the present invention is particularly useful in a lighting system wherein the various electric outlets are in the form of sockets for receiving conventional light bulbs, and this type of construction is further especially adapted for use in areas where there may be an appreciable amount of moisture, and wherein it is particularly important to provide an electrical system which is very well electrically insulated such as where the lighting system may be used in mines and like applications.

A particular feature of the present invention is the fact that a conventional insulated electrical cable of the type having three conductors therein may be employed, and the socket means may be spaced at any desired intervals along this conventional cable by the method hereinafter described without providing any substantial weakening of the cable construction itself. In other words, the electrical cable remains substantially intact throughout the length thereof to thereby maintain the desired degree of strength, while at the same time, the sockets are properly tied into the conductors of the cable in a novel manner.

The socket construction of the present invention is such that the various components of the socket are embedded within a body of insulating material such that the socket is substantially water-proof when in use, and in addition, the construction is such that the socket means itself is reinforced and protected to thereby readily resist damage due to rough use and abuse.

The socket means itself takes the form of a shell which is threaded for receiving a conventional light bulb, and a reinforcing sleeve is fitted around the shell so as to protect the shell and reinforce it.

Each of the various electrical outlets includes not only the socket means itself, along with a suitable contact for engaging the end of a light bulb, but in addition, a ground ring is provided on the outer surface of the molded body surrounding the socket means, this ground ring being connected with the ground conductor of the associated cable and also being electrically connected with a surrounding lamp guard to thereby serve as a safety feature and prevent sparking or shocks to personnel handling the apparatus.

The novel method of manufacture of the structure of the present invention results in a number of important and advantageous results. The electric contact means is fitted within an insulating member which is in turn clamped in the upper end portion of the threaded socket which receives the light bulb. These steps are performed prior to the molding operation, and a mandrel is also threaded within the socket prior to molding. As a result of this particular arrangement, when the body of material is molded about the socket means, the mandrel prevents entrance of the molded material at one end of the socket means while the insulating member and electric contact prevent entrance of molded material at the opposite end of the socket means. Accordingly, the molding material which may be rubber or similar substance is prevented from running down into the internally threaded portion of the socket means. This is an important advantage since in some prior art arrangements, molded material has often flowed down onto these threads thereby interfering with the proper threading and electric contact with the threaded shank portion of a light bulb.

This arrangement is also advantageous since the electric contact is held in a fixed position relative to the shell during the molding process and results in a finished product wherein the electric contact is retained in the proper position. It this connection, an important advantage of the invention is the fact that when the mandrel is removed from the end of the socket means opposite to that at which the electric contact is mounted, there is absolutely no tendency to pull out the electric contact which would tend to break the bond between the contact and the surrounding body of insulating material.

The contact member is also constructed so as to be relatively short and rigid so that there is no possibility of its coming in contact with the other leads embedded within the body of material and connected with the conductors of the cable, thereby preventing any short circuiting between the contact and such leads.

The leads from the electric contact and socket means as well as the ground ring are each tied into the conductors of the insulated cable in a novel manner by exposing the conductors and then tying the outer ends of the leads to the conductors. In this manner, the insulated cable is not substantially weakened and a very simple and effecive means is provided for electrically connecting the conductors of the cable with the components of the outlet means.

A further advantage of the novel method of the present invention is the fact that when the various components have been electrically connected with one another and all is in readiness for molding, it is merely necessary to screw in a single part, namely the mandrel into the socket means whereupon the entire assembly is placed within a mold and the molding material injected into the mold to complete the molding operation.

Upon removing the completely molded body from the mold, it is then merely necessary to trim off the flashing and clamp the lamp guard in place about the ground ring whereupon the assembly is completely manufactured.

An object of the present invention is to provide a new and novel portable insulated electrical distribution structure which is electrically insulated and incorporates a water-proof socket.

An object of the present invention is to provide a new and novel portable insulated electric distribution structure which is electrically insulated and incorporates a water-proof socket.

Another object is to provide a new and novel portable insulated electrical distribution structure including an insulated electrical cable which is substantially integral throughout its length and not substantially weakened and wherein the electrical outlet means may be spaced at any desired interval along the cable.

A further object of the invention is the provision of a new and novel portable insulated electrical distribution structure including a socket means provided with a surrounding reinforcing sleeve and which is embedded within a resilient body of insulating material so as to resist damage thereto.

Yet another object of the invention is to provide a new and novel portable insulated electrical distribution structure incorporating a ground ring to which is connected a lamp guard and serving as a safety device, a relatively short and rigid contact member being provided so as to prevent short circuiting to the other leads embedded within the body of insulating material.

A still further object of the invention is to provide a new and novel method of manufacture of a portable insulated electrical distribution structure which ensures that the molded material does not run into the internal threads of the socket means of the apparatus.

Still another object of the invention is the provision of a novel method of manufacturing a portable insulated electrical distribution structure which ensures that the electric contact means is held in a fixed position relative to the shell and which further assures that the bond between the contact and the surrounding body of insulation is not broken when the mandrel is removed and the molded body removed from the mold.

Yet another object of the invention is to provide a method of manufacturing a portable insulated electrical distribution structure, wherein during the method of manufacture only one part need be screwed back into position and then unscrewed, thereby affording a higher rate of production.

Yet a further object of the invention is to provide a new and novel portable insulated electrical distribution structure which is quite simple and inexpensive in construction, and yet which is sturdy and reliable in operation and which can be easily and rigidly manufactured in a substantially fool-proof manner.

Other objects and many attendant advantages of the invention will become more apparent when considered in connection with the specification and accompanying drawings, wherein:

FIG. 1 is an elevation partly broken away illustrating a streamer constructed according to the present invention;

FIG. 2 illustrates three lengths of electrical lead having cut lines thereon for cutting away insulation;

FIG. 3 illustrates a pair of components adapted to be fitted together in manufacturing the invention;

FIG. 4 illustrates the construction at one stage of manufacture;

FIG. 5 illustrates the construction at a further stage in the manufacture of the apparatus;

FIG. 6 illustrates the manner in which the reinforcing sleeve is fitted over the socket shell;

FIG. 7 illustrates the manner in which one of the leads is connected with the socket shell;

FIG. 8 illustrates another component of the structure;

FIG. 9 illustrates the various components connected with the associated leads prior to connection with a cable;

FIG. 10 illustrates the manner of cutting into the cable for locating a conductor;

FIG. 11 illustrates the manner in which a conductor of the cable is bared;

FIG. 12 shows a tool employed for making a space under a conductor for receiving one of the leads;

FIG. 13 shows the manner in which one of the leads is slipped under one of the conductors;

FIG. 14 illustrates the knot employed for tying each of the leads under an associated conductor;

FIG. 15 shows the mechanical components tied to the conductors of the cable with a mandrel adjacent thereto;

FIG. 16 illustrates the components as shown in FIG. 15, after insertion within one-half of a mold;

FIG. 17 is a cross section taken substantially along line 17—17 of FIG. 16, looking in the direction of the arrows with both halves of the mold in place and with the molded material only filling a portion of the cavity defined within the mold;

FIG. 18 is a cut-away view of the completely molded body;

FIG. 19 illustrates the manner in which the lamp guard is finally clamped in place on the ground ring; and FIG. 20 is a sectional view illustrating a modified form of the invention.

Referring now to the drawings wherein like reference characters designate corresponding parts throughout the several views, there is shown in FIG. 1 a streamer according to the present invention including a conventional insulated electric cable 20 having three separate electrical conductors therewithin, the cable having a plug 21 at one end thereof having three separate prongs 22 which are adapted to be inserted within suitable sockets in a complementary connector means.

Three separate spaced outlet means indicated by reference numerals 25 are provided, each of these outlet means including a socket 26 within which is mounted a conventional electric light bulb 27, the sockets being surrounded by a body of insulating material which is bonded to the cable. These bodies of insulating material also include laterally extending portions 28 having openings 29 therein defined by grommets, these openings being for the purpose of facilitating handling of the apparatus and hanging up of the streamer when desired. A lamp guard 30 is disposed about each of the electric light bulbs to protect the associated light bulb.

Considering now FIGS. 2–17, the method of connecting the electrical components and molding the body of insulating material thereabout is illustrated. As seen in FIG. 2, three lengths of electrical lead in the form of pigtail wires 35, 36 and 37 are illustrated, these wires being for example 4½ inches long.

These leads serve to connect various components of the outlet means with the three conductors in the electric cable as hereinafter described.

The dotted lines on each of these lengths of lead indicate where the insulation is cut for stripping off the insulation as hereinafter described.

Referring to FIG. 3, an electric contact 40 is provided, this member being formed of soft brass or similar material which is readily deformed and including a main shank portion 41 having an internal bore 42 formed therein, the contact having an enlarged head 43 formed at one end thereof.

An insulating member 45 is provided, this member being of substantially disc-like configuration, and having a central opening 46 formed therethrough. Insulating member 45 is formed of a suitable electrical insulating material such as a laminated phenolic plastic or the like. The central opening 46 in the insulating member is adapted to tightly receive the shank portion of contact 40, and accordingly, the contact is press-fitted within opening 46 and a straight knurled portion 48 formed on contact 40 is thereby forced into the wall portion defining opening 46 of the insulating member 45 to lock the contact member thereto and to prevent any relative rotation therebetween.

FIG. 4 shows the contact 40 disposed in operative position in the associated insulating member 45, and after so assembling these two members, one end portion of lead 35 is stripped of insulation for approximately ⅜ inch in the example of the present invention, the bared end of the lead then being inserted within the bore provided in contact 40 and crimped in place as indicated at 50 by means of a kick press or the like, for securely mechanically and electrically interconnecting lead 35 with contact 40.

The next step is illustrated in FIG. 5, wherein an electrical connector means hereinafter referred to as a socket or shell is provided and is indicated generally by reference numeral 52. It will be noted that this socket shell is hollow and includes an outwardly flared lower end portion 53, an internal threaded wall portion 54 and an upwardly extending open end portion 55. It will be noted that an inwardly extending portion 56 defines an upwardly facing shoulder, and the next step is to insert the assembly shown in FIG. 4 within the open upper end of the socket shell 52 into the position shown in FIG. 5, wherein the insulating member 45 rests upon the aforementioned upwardly facing shoulder. The entire assembly is then placed in a kick press jig or the like, and the upper end portion of the socket shell is then crimped or rolled into the dotted line position shown in FIG. 5 so as to securely retain the insulating member and contact member in fixed relation to the socket shell.

Referring to FIG. 6, a cylindrical reinforcing sleeve 60 is provided which is adapted to fit tightly about the outer surface of the socket shell 52, and the second lead 36 is stripped at the lower end thereof and held against the outer surface of the socket shell as seen in FIG. 6, while the sleeve 60 is moved downwardly into surrounding relationship with respect to the socket shell thereby clamping the lower bared end portion of lead 36 between the socket shell and the sleeve, the sleeve being manually pressed onto the socket shell, there being a finger fit between the socket shell and the sleeve.

The assembly is then placed in a jig and the lower bared end of lead 35 is soldered to the ring and shell by a body of solder 61 as clearly seen in FIG. 7, thereby providing an efficient mechanical and electrical connection between lead 36, the socket shell and the surrounding sleeve.

Referring to FIG. 8, an annular electrically conductive ground ring 65 formed of brass or similar material is provided, and the lower end of the third lead 37 is stripped away 5/16 inch, these members being placed on a soldering jig and the lower bared end of lead 37 being soldered to the ground ring.

Referring now to FIG. 9, the opposite or upper end of lead 35 has the insulation stripped away approximately 5/8 inch and the open or upper end of lead 36 has the insulation thereof stripped away approximately one inch.

The opposite or upper end of lead 37 is also stripped away sufficiently to leave approximately 1¼ inches of insulation about the lead. After each of these leads is stripped as shown, the stripped portion has solder applied thereto so as to form a point at the end of the wire as indicated in the drawing.

Referring now to FIG. 10, the cable 20 is shown as having three conductors 67, 68 and 69 disposed therewithin, these conductors respectively being the black wire, the white wire and the green wire as these cables are conventionally coded. As seen in FIG. 10, a knife or similar instrument indicated by reference numeral 70 is provided, and the blade 71 thereof is utilized to cut through the insulation of the cable, making a partial circumferential cut so as to find the black wire. After the black wire has been found, it is cut into and sufficient insulation cut away to expose the black wire as indicated by reference numeral 73 in FIG. 11.

The cutting member is then moved over approximately ¾ of an inch to the right of this point and another circumferential cut as indicated by reference numeral 75 is made slightly angularly removed around the cable for exposing the white wire. This white wire is cut into and the conductor exposed as indicated by reference numeral 76 is FIG. 12.

The cutting instrument is then moved approximately ¾ of an inch to the left of the original cut and another circumferential cut is made in the cable as indicated by reference numeral 77, in a position disposed angularly in an opposite direction from the original cut as was the cut 75 to thereby find the green wire. The green wire is then cut into to expose the conductor therein as indicated by reference numeral 78 in FIG. 12.

Returning now to the exposed black wire inner conductor, an opening is formed under this conductor with a tool as indicated by reference numeral 80 having a tapered lower end 81, this tapered end being forced under the conductor as shown in FIG. 12. After having formed the opening under conductor 73 according to the method shown in FIG. 12, the upper stripped end of lead 35 is first slipped through the opening created by the tool as seen in FIG. 13, and then tied to the conductor by means of the novel knot illustrated in FIG. 14, the knot being tied in the manner clearly illustrated and indicated by the arrows in FIG. 14.

This knot is tightened up and the members are thereby firmly connected to one another.

Next, tool 80 is employed for making an opening under conductor 76, and the upper stripped end of lead 36 is connected to the white conductor 76 by means of the knot shown in FIG. 14. The tool 80 is then employed for making an opening under the green conductor 78 and the stripped outer end of lead 37 is tied to the green conductor again using the same knot as illustrated in FIG. 14.

Referring now to FIG. 15, the assembly is shown after each of leads 35, 36 and 37 have been tied to the various electrical conductors within cable 20. Also shown in this figure is a mandrel indicated generally by reference numeral 85, and including a central laterally extending disc-like portion 86, a lower cylindrical shank portion 87 and an upwardly extending portion 88 having threads formed on the outer surface thereof complementary to the threads formed on the inner surface of socket shell 52 whereby this upwardly extending portion of the mandrel is adapted to be threaded within the socket shell. The mandrel is then threaded within the socket shell until a lateral shoulder 89 formed thereon engages the lower flared end of the socket shell, this shoulder appearing most clearly in FIG. 16. As seen in FIG. 16, one half of a mold indicated by reference numeral 90 is illustrated, this half of the mold including a semi-cylindrical cutout portion 91 for receiving the shank 87 of the mandrel, and having a semi-cylindrical groove 92 therein which receives the ground ring 65. A pair of substantially semi-cylindrical portions 94 and 95 receive the cable 20, these portions flaring outwardly as indicated at 94' and 95' to intersects a substantially semi-cylindrical cutout 96 which is adapted to form an enlarged portion of the finally molded body in surrounding relationship to the insulation of the cable. It will also be noted that a recess 98 is formed in the mold for forming the laterally extending attaching portion of the molded body while an enlarged cavity 99 is disposed about the reinforcing sleeve and socket shell at the lower portion of FIG. 16 for providing the body of insulating material which is disposed in surrounding relationship to these portions.

A recess portion 100 at the central portion of the mold defines a portion of a dome for forming rounded laterally extending portions on the finished insulating body as will hereinafter appear.

A pair of guide pins 102 are provided for guiding the two halves of the die with respect to one another. It will be seen in FIG. 16 that the assembly as shown in FIG. 15 is adapted to be fitted within one half of the mold as illustrated.

Referring to FIG. 17, the other half of the mold is illustrated, this half of the mold having cutout portions complementary to those shown in the other half of the mold previously described. The two halves of the mold are clamped together in a well-understood manner and held in position during the molding operation in any suitable manner. An inlet 105 is provided for injecting the material of the molded body into the mold and a fitting 106 is shown as connected to this opening for injecting the material such as rubber within the mold. As shown in FIG. 17, the interior cavity of the mold is shown as being partially filled with the insulating material, it being understood that insulating material is injected so as to completely fill the various cavities and cutout portions of the mold.

It will also be noted as seen in FIG. 17 that each half of the mold is provided with a short pin portion, these pin portions being indicated by reference numerals 107 and 108 respectively, the two pin portions abutting each other and being adapted to support a substantially cylindrical grommet 110 having outwardly flared end portions during the molding operation, this grommet, of course, being inserted in position first over pin 107 as shown in FIG. 16, and then receiving the other pin 108 as shown in FIG. 17 during the molding operation, it being apparent that the grommet will be completely surrounded by the molded material and will define an opening extending therethrough.

After the molding operation is completed, the two halves of the mold are separated, and the molded outlet is removed from the mold. Any flashing which may exist on the molded body is then removed, and the outer surface of the ground ring 65 is inspected and cleaned if necessary to ensure that the outer surface thereof is exposed such that it will contact the lamp guard hereinafter described.

The finished molded structure is shown in FIG. 18, partially cut away for the purpose of illustration, and it will be seen that an enlarged main body portion 115 is defined about the cable 20 and extends longitudinally thereof, the laterally extending portion 116 of the finished body having the grommet 110 embedded therein to define an opening therethrough. Portion 121 defines a part of the dome-shaped configuration and a similar portion extends outwardly on the opposite side of portion 115. It will be noted that the socket shell 52 and its surrounding sleeve 60 along with contact 40 and ground ring 65 are all embedded within the body of insulating material indicated generally by reference numeral 125, it being apparent that this body of material will retain these components in operative position and will serve to effectively prevent damage to the socket means therewithin while providing good electric and water-proof insulation for the socket means.

Referring now to FIG. 19, the final steps of assembly of the completed structure are illustrated, and as seen in this figure, a lamp guard is formed of two similar halves indicated by reference numerals 127 and 128, each of these halves comprising a plurality of downwardly extending rod-like members 129 and laterally extending rod members 130, the various rod members being welded to one another in the manner illustrated and being welded at their upper ends to a pair of clamp rings 127' and 128' respectively. Each of these clamp rings is provided with openings formed through the opposite outwardly extending end portions thereof, these openings being adapted to receive a pair of bolts 132 which extend through the aligned openings in the ends of the clamp rings and are threaded into nuts 133, only one of which is visible in FIG. 19, these nuts being preferably welded to the clamp ring 128'.

As seen in FIG. 19, the two clamp rings 127' and 128' are adapted to fit snugly about the outer surface of ground ring 65 and the laterally extending end portions of the two clamp rings will normally be spaced slightly from one another such that by drawing up bolts 132, the clamp rings may be tightly clamped on the ground ring 65. This assures a good electrical contact between the electrically conductive members 129 and 130 of the clamp guard which may be formed for example of steel and the ground ring and thence to the ground conductor within the cable 20 to thereby assure that all sparking and shock hazards are eliminated.

Referring now to FIG. 20 of the drawings, a modified form of the invention is shown, wherein the construction of the device is substantially identical to that shown in FIG. 18, for example, similar parts having been given the same reference numeral primed.

In this modification, a member 140 is inserted through the central opening provided in the insulating member 45' which is clamped in position in the upper end of the socket shell 52'. This member 140 is provided with an internal threaded bore and a separate replaceable contact member 141 is threaded within this bore. Contact member 141 is provided with a threaded shank 142 which, of course, is threadably mounted within the bore of member 140, and an enlarged head 143 is provided at the lower end of this replaceable contact member.

It is apparent that if it should be desired to replace the electric contact in the modification shown in FIG. 20, it is merely necessary to unthread the member 141 and remove the same from the structure, and then a new contact may be threaded into place within the device.

It is apparent from the foregoing that there is provided a new and novel portable insulated electric distribution structure which is particularly adapted for forming a streamer construction as set forth herein.

The completed apparatus provides an electrically insulated and substantially water-proof socket means, these electrical outlets being of such a nature that they may be spaced at any interval along a conventional insulated cable while the cable itself is not substantially weakened and in fact is substantially integral throughout its length. The finished construction is resilient and resistant to damage due to the fact that the socket means is surrounded by a resilient body of insulating material, and furthermore, a reinforcing sleeve is provided around the socket shell to prevent damage thereto.

A ground ring is provided on the outer surface of the molded body for engagement with a lamp guard to ensure that there will be no shocks or sparks created by contact with the lamp guard. The electric contact utilized in the construction is relatively short and rigid and therefore it can not short out with the other electric leads embedded within the molded body. It is apparent that the structure of the present invention is quite simple and inexpensive in construction and yet is quite sturdy and reliable in use.

The method of manufacturing the structure is quite advantageous since the insulating member and electric contact prevent the molded material from running down into the threads of the socket means. The electric contact employed in the present invention is held in fixed position relative to the shell, both during the molding operation and in the finished product, and furthermore, when the mandrel is removed from the socket shell, the bond between the electric contact and the surrounding body of insulation will remain intact, and there is no possibility of pulling the electric contact out of its desired position.

In addition, since it is only necessary to thread the mandrel into and out of the socket means to complete the manufacture of the device, a minimum amount of time and effort is required resulting in a high production rate.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Portable insulated electrical distribution structure comprising a continuous insulated electrically conductive cable having a plurality of electrical conductors therein, a body of insulating material on said cable, and bonded thereto, a plurality of electrical leads embedded within said body, each of said electrical leads being connected with a different one of said electrical conductors within said insulated cable at an intermediate point along the length of the conductor and the cable, said cable having a plurality of partial circumferential cuts formed in the outer portion thereof to provide access to said conductors for connection of said leads thereto, said cuts extending radially inwardly from the outer surface of the cable only a minor portion of the diameter of the cable, said cuts being spaced from one another longitudinally along said cable and also being spaced angularly around the cable from one another such that the electrical cable remains substantially intact throughout the length thereof to maintain the desired degree of strength and without substantially weakening the cable construction while permitting electrical leads to be connected to an intermediate portion of the conductors within the cable, electrical connector means electrically connected with one of said leads, electrical contact means electrically connected with another of said leads, said electrical connector means and electrical contact means being electrically insulated from one another, said body of insulating material being disposed in surrounding relationship to said electrical connector means and said contact means for maintaining the connector means and the contact means in operative position and for protecting and insulating the connector means and contact means.

2. Apparatus as defined in claim 1 wherein there are three conductors disposed within said cable, there being three electrical leads embedded within said body, and an annular electrically conductive ring being supported at the outer surface of said body and electrically connected with one of said electrical leads.

3. Apparatus as defined in claim 1 wherein said electrical connector means comprises a hollow socket, an insulating member closing the upper end of said socket and having an opening formed therethrough, said electrical contact means being tightly fitted within said opening in said insulating member, and including a substantially rigid sleeve disposed in surrounding relationship to said socket for rigidifying and protecting the socket.

4. Apparatus as defined in claim 3 wherein the electrical lead connected with said socket is clamped between said socket and said sleeve and is additionally secured to said socket.

5. The method of manufacturing portable insulated electrical distribution structure comprising providing an insulated cable having a plurality of electrical conductors therein, providing an electrical contact and an electrical connector means, connecting one end of an electrical lead with said contact means, connecting one end of another electrical lead with said connector means, forming a plurality of partial circumferential cuts in the outer portion of said cable, with said cuts extending radially inwardly of the cable only a minor portion of the diameter of the cable, said cuts being made so as to be spaced from one another longitudinally along said cable and also being circumferentially spaced about the cable from one another such that the electrical cable remains substantially intact throughout the length thereof to maintain the desired degree of strength and without substantially weakening the cable construction, exposing one of said conductors within the cable through each of said cuts, connecting the opposite end of each of said electrical leads to a different one of said conductors, and then molding a body of insulating material on said cable and around said contact and connector means for insulating and protecting said contact and connector means.

6. The method as defined in claim 5 including the steps of providing an annual ground ring, connecting one end of a further electrical lead to said ground ring and connecting the opposite end of said last-mentioned lead to still another of said conductors, and wherein the molding step includes molding the body of insulating material in contact with said ground ring for retaining the ground ring in operative relationship about the outer surface of the body of insulating material.

7. The method as defined in claim 5 wherein said contact means is adapted to engage said connector means and including the step of interengaging the contact and connector means to fix the contact in fixed relationship to said connector means.

8. The method as defined in claim 5 including the step of securing one of said electrical leads to said connector means by placing a sleeve tightly around said connector means with the end of the electrical lead interposed therebetween.

9. The method as defined in claim 5 wherein each of the various electrical leads is connected to the respective conductor within the cable by turning a nut in the outer end of each of said electrical leads and around the respective conductors.

References Cited in the file of this patent

UNITED STATES PATENTS

| Number | Name | Date |
|---|---|---|
| 1,238,885 | Chmela | Sept. 4, 1917 |
| 1,845,638 | Wermine | Feb. 16, 1932 |
| 1,891,141 | Combe | Dec. 13, 1932 |
| 1,979,485 | McPartlin et al. | Nov. 6, 1934 |
| 2,133,159 | Weston | Oct. 11, 1938 |
| 2,260,121 | Miller | Oct. 21, 1941 |
| 2,376,316 | Schwartz | May 15, 1945 |
| 2,677,118 | Stone | Apr. 27, 1954 |
| 2,697,211 | Voelkner et al. | Dec. 14, 1954 |
| 2,708,714 | Stevens | May 17, 1955 |
| 2,962,691 | Mande et al. | Nov. 29, 1960 |

FOREIGN PATENTS

| 121,064 | Australia | Feb. 19, 1946 |
|---|---|---|